United States Patent
Loisel et al.

(10) Patent No.: US 11,023,567 B2
(45) Date of Patent: Jun. 1, 2021

(54) SOFTWARE INTELLECTUAL PROPERTY PROTECTION SYSTEMS AND METHODS FOR EMBEDDED PLATFORMS

(71) Applicant: Maxim Integrated Products, Inc., San Jose, CA (US)

(72) Inventors: Yann Yves Rene Loisel, La Ciotat (FR); Frank Lhermet, Roquevaire (FR); Stephane Di Vito, La Ciotat (FR); Vincent Albanese, Peypin (FR)

(73) Assignee: Maxim Integrated Products, Inc., San Jose, CA (US)

( * ) Notice: Subject to any disclaimer, the term of this patent is extended or adjusted under 35 U.S.C. 154(b) by 301 days.

(21) Appl. No.: 16/038,998

(22) Filed: Jul. 18, 2018

(65) Prior Publication Data

US 2019/0042712 A1 Feb. 7, 2019

(30) Foreign Application Priority Data

Aug. 1, 2017 (FR) ...................................... 1757380

(51) Int. Cl.
| | |
|---|---|
| *H04L 29/06* | (2006.01) |
| *G06F 21/14* | (2013.01) |
| *G06F 11/36* | (2006.01) |
| *G06F 21/62* | (2013.01) |
| *H04L 9/06* | (2006.01) |
| *G06F 21/12* | (2013.01) |
| *G06F 21/10* | (2013.01) |
| *H04L 9/00* | (2006.01) |
| *G06F 8/74* | (2018.01) |

(52) U.S. Cl.
CPC ................ *G06F 21/14* (2013.01); *G06F 8/74* (2013.01); *G06F 11/3648* (2013.01); *G06F 21/10* (2013.01); *G06F 21/12* (2013.01); *G06F 21/6281* (2013.01); *H04L 9/002* (2013.01); *H04L 9/0631* (2013.01); *H04L 63/04* (2013.01)

(58) Field of Classification Search
None
See application file for complete search history.

(56) References Cited

U.S. PATENT DOCUMENTS

| | | | | |
|---|---|---|---|---|
| 4,558,176 | A * | 12/1985 | Arnold ..................... | G06F 21/10 380/29 |
| 4,573,119 | A * | 2/1986 | Westheimer ........ | G06F 12/1408 711/E12.092 |
| 6,272,637 | B1 * | 8/2001 | Little ....................... | G06F 21/72 713/194 |
| 8,307,215 | B2 * | 11/2012 | Camiel .................. | G06F 21/123 713/189 |
| 8,473,754 | B2 | 6/2013 | Jones et al. | |

(Continued)

*Primary Examiner* — Maung T Lwin
(74) *Attorney, Agent, or Firm* — North Weber and Baugh LLP; Michael North

(57) ABSTRACT

Presented are software intellectual property (IP) protection systems and methods that prevent potential attackers as well as customers from having access to plain text versions of both library source code and binary code. Potential attackers are prevented from reusing the software on other platforms. The protection mechanism does not impact the functionality or the performance of the library itself and does not interfere with existing software update mechanisms or application developer tools, such as Joint Test Action Group (JTAG).

20 Claims, 7 Drawing Sheets

(56) References Cited

U.S. PATENT DOCUMENTS

| | | | | |
|---|---|---|---|---|
| 8,736,626 | B2* | 5/2014 | Ostiguy | H04N 5/913 345/531 |
| 8,914,648 | B1* | 12/2014 | Pierson | H04L 9/0656 713/190 |
| 8,949,624 | B2* | 2/2015 | Kocher | G11B 20/00115 713/193 |
| 2003/0200453 | A1* | 10/2003 | Foster | G06F 21/575 726/16 |
| 2008/0276100 | A1* | 11/2008 | Varone | G06F 21/123 713/190 |
| 2010/0169546 | A1* | 7/2010 | Van Acht | G06F 9/4812 711/103 |
| 2011/0296202 | A1* | 12/2011 | Henry | H04L 9/0827 713/190 |
| 2016/0104009 | A1* | 4/2016 | Henry | G06F 9/30178 713/190 |
| 2016/0105282 | A1* | 4/2016 | Henry | H04L 9/0618 713/190 |
| 2017/0076102 | A1 | 3/2017 | Ishihara et al. | |
| 2017/0277897 | A1 | 9/2017 | Jang et al. | |

* cited by examiner

SOFTWARE INTELLECTUAL PROPERTY PROTECTION SYSTEMS AND METHODS FOR EMBEDDED PLATFORMS

CROSS-REFERENCE TO RELATED APPLICATIONS

This application claims foreign priority under 35 U.S.C. § 119, to French Patent Application No. 1757380, entitled SOFTWARE INTELLECTUAL PROPERTY PROTECTION SYSTEMS AND METHODS FOR EMBEDDED PLATFORMS, naming as inventors, Yann Yves Rene Loisel, Frank Lhermet, Stéphane Di Vito, and Vincent Albanese, and filed Aug. 1, 2017, which application is hereby incorporated herein by referende in its entirety.

A. TECHNICAL FIELD

The present disclosure relates to secure systems. More particularly, the present disclosure related to systems and methods for protecting software IP in embedded platforms such as microcontrollers.

B. DESCRIPTION OF THE RELATED ART

Software providers in the business of licensing and selling code develop valuable proprietary software, such as binary code that comprises intellectual property. Typically, the proprietary software is compiled and stored in a software library and delivered to a customer, e.g., an application developer, who uses and integrates the software into its own applications. Creating such software oftentimes involves expending considerable time and effort; however, software is relatively easily copied, shared by electronic means, modified, and reused on different platforms. Due to the nature of their business, software providers cannot completely hide their product. For example, by making available a limited demonstration version of a program for the purpose of attracting potential customers, a software provider reveals critical information to third parties. For a resourceful intruder or a dishonest application developer, the information can be used to start an attack at numerous fronts, such as servers, computers, and embedded devices, to unlawfully extract the valuable IP contained in binary code using reverse engineering techniques, such as disassembling and then applying assembly code analysis, to extract information about the algorithm.

Legal solutions such as contractual agreements tend to be insufficient deterrents that do not provide for effective software IP protection. In addition, inherent uncertainty and the time and resources required for enforcing IP rights by legal means presents a burden on patent holders that many find it unacceptable as too intrusive on their business activities. For example, for most patentees, the path to worldwide patent protection is prohibitively expensive and enforceability is paved with different issues that face a patent holder in different countries. Furthermore, patenting is not a suitable option for software providers who prefer to keep their IP and company know-how as trade secrets.

Accordingly, what is needed are systems and methods that at all times prevent attackers from gaining access to valuable binary or source code, such as the plain text version of a library code stored on a microcontroller or other platform. The ideal protection mechanisms would have no negative impact on the functionality or performance of resources, e.g., memory power consumption, and would not cause any interference with existing software update mechanisms, application developers' use of JTAG probes, or any other common tools of the trade.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments.

FIGURE ("FIG.") 1 illustrates the generation and transmission of an encrypted library into the memory of a customer device, according to various embodiments of the present disclosure.

DETAILED DESCRIPTION OF THE PREFERRED EMBODIMENTS

Figure 1:
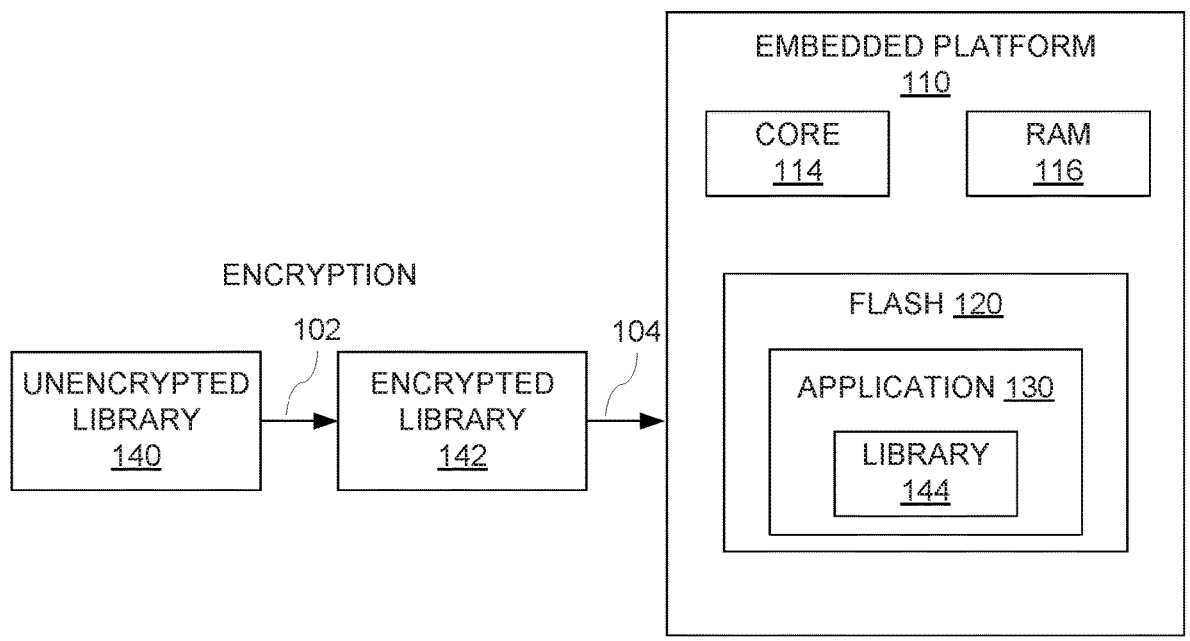

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a tangible computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. Furthermore, the use of memory, database, information base, data store, tables, hardware, and the like may be used herein to refer to system component or components into which information may be entered or otherwise recorded.

Furthermore, it shall be noted that embodiments described herein are given in the context of secure microcontrollers, but one skilled in the art shall recognize that the teachings of the present disclosure are not limited to any type of microcontroller and may equally be may be of interest to any software provider who wants to use IP protection services in other contexts and applications.

In this document library and library code may be used interchangeably. "Software IP" includes any secret sought to be protected.

Certain embodiments disclose a security system for protecting software from reverse engineering. The security system may comprise a core that is coupled to an instruction code bus and configured to call an application and to execute decrypted instructions; a cache that is coupled to communicate the decrypted instructions, e.g., via an instruction code bus, to the core; a decryption engine that is configured to decrypt instructions and load the decrypted instructions into the cache; a library memory register (LMR) that defines an address range that is inaccessible to an application developer; a non-volatile memory, such as external flash memory, configured to store encrypted instructions in the address range and non-encrypted instructions in a second address range; and a processor that in response to code being called by the application, determines whether a program counter falls in the first address range and, if so, communicates the encrypted instructions to the decryption engine, and if the program counter falls in the second address range, the processor loads the non-encrypted instructions into the cache without communicating the encrypted instructions to the decryption engine.

The security system may further comprise hardware that uses a jump table to control one of a function and an entry point to the non-volatile memory to prevent access to a library, and a data bus to access encrypted data in the first address range, thereby, preventing access to a plain text version of the encrypted data. The encrypted data may be executable code or a library source code and may be encrypted, e.g., with a key embedded in silicon, by a controller comprising a secure AES engine.

In embodiments, at least a portion of the library source code that comprises encrypted code may be decrypted and then re-encrypted using a unique key that is associated with a chip. In embodiments, the security system, in response to a program counter pointing to a protected range that comprises encrypted instructions, disables a debug enable signal to disable access by a debugger device, such as JTAG probe, thereby preventing direct memory access to the first address range.

In embodiments, in response to the program counter pointing outside of the protected range, the debug enable signal is enabled to restore access by the debugger device to resume debugging operations.

Some embodiments disclose a method for protecting software from reverse engineering. The method comprises, in response to code being called by an application, determining whether a program counter falls in a first address range of a non-volatile memory that comprises encrypted instructions that are inaccessible to an application developer, is defined by an LMR, and comprises a second address range to store non-encrypted instructions. In response to determining that the program counter falls in the first address range, the encrypted instructions are communicated to a decryption engine that generates decrypted instructions from the encrypted instructions. The decrypted instructions are loaded into a cache prior to communicating them, via an instruction code bus, to a core that executes the decrypted instructions. Finally, in response to determining that the program counter falls in the second address range, the non-encrypted instructions are loaded, via the instruction code bus, into the cache without communicating the encrypted instructions to the decryption engine.

In embodiments, the method further comprises, in response to a program counter pointing to a protected range that comprises encrypted instructions, disabling a debug enable signal to disable access by a debugger device thereby preventing direct memory access to the first address range, and in response to the program counter pointing outside of the protected range enabling the debug enable signal to restore access by the debugger device to resume debugging operations.

In embodiments, the method further comprises, in response to a request by the core and prior to loading the decrypted instructions into the cache, using the decryption engine to commence an on-the-fly decryption process. The decrypted instructions may be based, for example, on a block size of the decryption engine.

FIG. 1 illustrates the generation and transmission of an encrypted library into the memory of a customer device, according to various embodiments of the present disclosure. In embodiments, a software provider may encrypt an unencrypted library 140, e.g., prior to delivery to the customer, to generate encrypted library 142. The encrypted library 142 may then be delivered, in encrypted format, to a customer's embedded platform 110. As such, library 144 is protected from unwanted exposure, and software IP protection is established from initial delivery throughout the use of the software at the customer's embedded platform 110.

In embodiments, library 144 is programmed into memory 120 from which location it may be decrypted and executed, e.g., without first making a copy of library 142 into internal RAM 116. It is understood that library 142 may be implemented as a plurality of libraries in memory 120 or as a distributed library. Memory 120 may be any type of non-volatile memory, e.g., an embedded flash memory.

It is understood that any encryption method 102 known in the art may be used to encrypt library 140, e.g., to generate a decryption key that is not intended to be shared with a customer, who would otherwise have access to proprietary code stored therein. In embodiments, the decryption key (e.g., for the AES or any other symmetric cryptographic algorithm) may be a random (i.e., not easily guessable) key that may be used by a flash controller and, for enhanced protection, may be stored outside of flash memory 120.

In embodiments, the generated key may be embedded in silicon, i.e., in the chip. As a result, since the cost (in time, tools, effort, etc.) for extracting the key from the silicon to circumvent the protections that are provided by the embodiments of the present disclosure greatly exceeds the cost of reverse engineering the IP stored in software library 144, the overall benefit of the disclosed software IP protection systems and methods remains positive. In embodiments, different keys may be provided to different customers or users to further increase software IP protection.

In addition, for ease of key management and customization, a chip provider may use one unique key to encrypt library 144, which a customer may program on a number of chips, then the library for each different chip may be decrypted and re-encrypted using a local and chip-unique key, such that each chip may comprise a different image.

Figure 2:
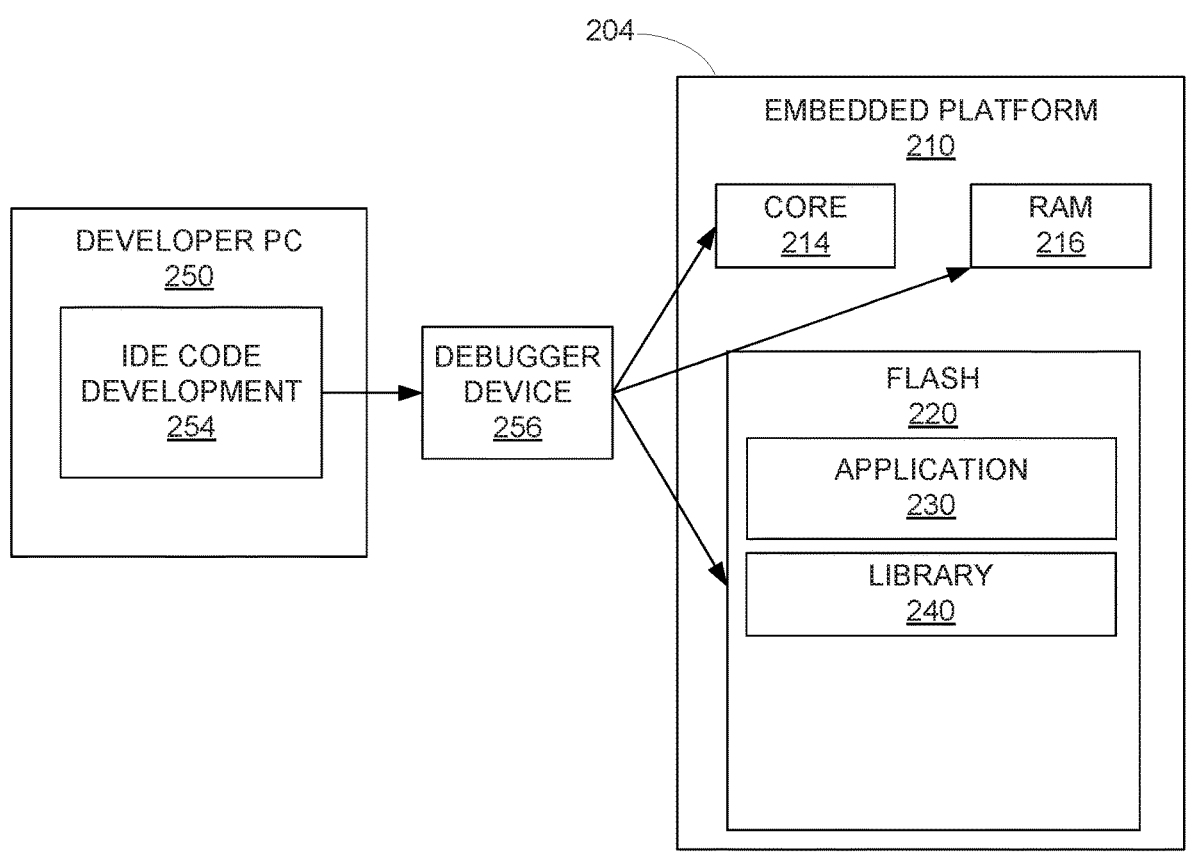
FIG. 2 illustrates the intrusive effect of a debugger device on a system comprising to-be-protected software IP, according to various embodiments of the present disclosure.

FIG. 2 illustrates the intrusive effect of a debugger device on a system comprising to-be-protected software IP. Debugger device 256 may be a JTAG probe or any other tool for debugging software issues during application development. While device 256 may be helpful, debugging tool the use of device 256 is rather intrusive on a chip 204 that may comprise embedded platform 210. As illustrated in FIG. 2, debugger device 256 has access to almost any part of the probed platform 210, which provides numerous points of attack for intruders. In addition, since library 240 has to run in plain text to be readable by a microcontroller, use of debugger device 256 by an application developer enables, from a software provider's point of view, an unwanted access to the valuable code and IP that may be stolen by a successful attacker.

Therefore, it would be desirable to have solutions that protect library 240 and its content, e.g., by restricting access to plain text versions of the library code by potential intruders, and without interfering with an application developers ability to troubleshoot and debug application code 230 by using debugger device 256.

Figure 3:
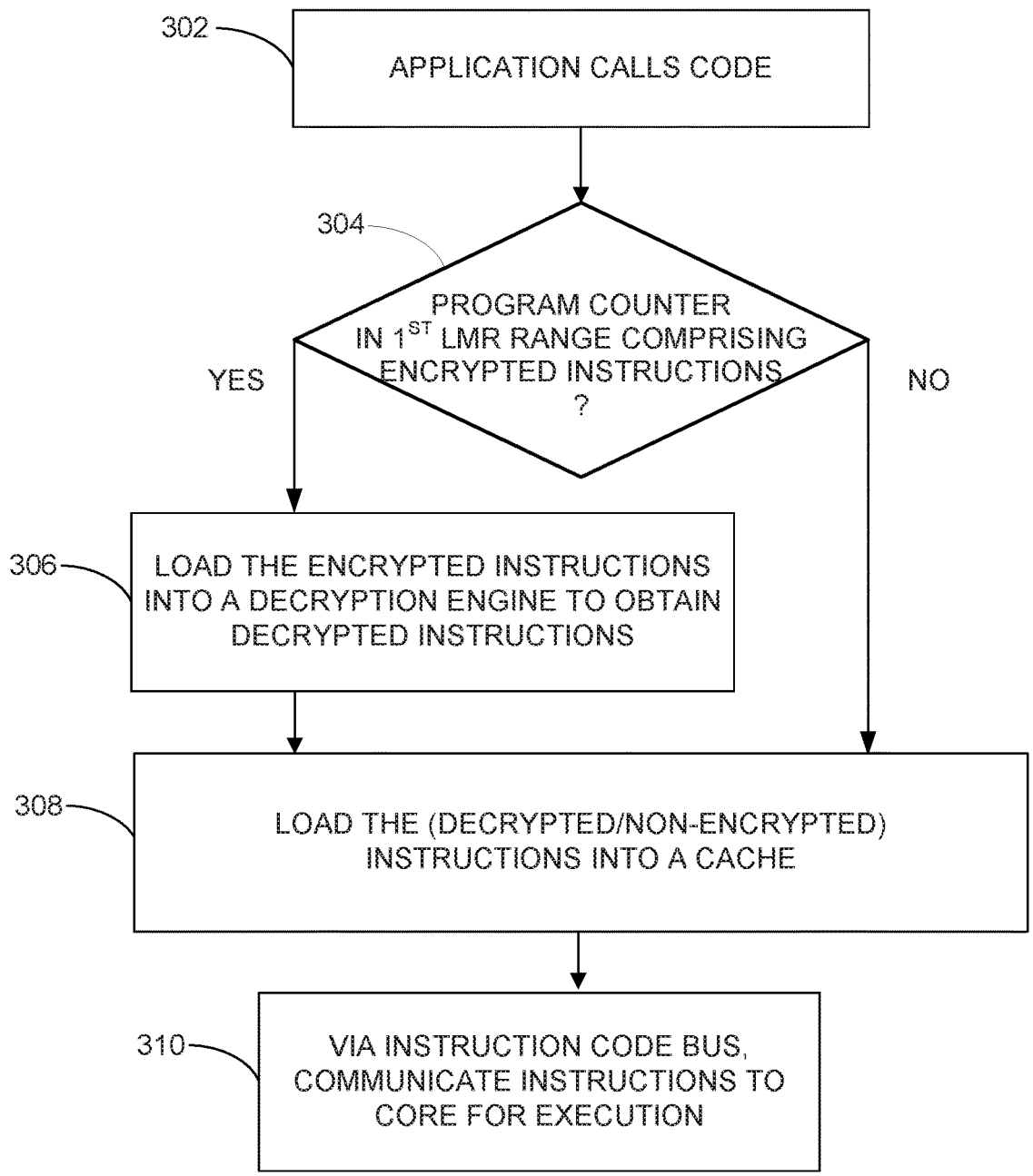
FIG. 3 is a flowchart of an illustrative process for protecting software IP from reverse engineering according to various embodiments of the present disclosure.

FIG. 3 is a flowchart of an illustrative process for protecting software IP from reverse engineering according to various embodiments of the present disclosure. Process 300 begins at step 302 when an application calls code, e.g., a specific function.

At step 304, in response to the code being called, it is determined whether a program counter falls in a first region of a memory (e.g., nonvolatile memory) that comprises encrypted instructions. In embodiments, the region comprising the encrypted instructions is defined by an LMR.

If the program counter falls in the first region, then, at step 306, the encrypted instructions are communicated to a decryption engine to obtain decrypted instructions, and, at step 308, the decrypted instructions are loaded into a cache.

Otherwise, if at step 304 it is determined that the program counter does not fall in the first region, then, process 300 directly loads non-encrypted instructions into the cache.

At step 310, the decrypted/non-encrypted instructions are communicated, via an instruction code bus, from the cache to a core, e.g., for immediate execution.

It is noted that 1) certain steps may optionally be performed; 2) steps may not be limited to the specific order set forth herein; 3) certain steps may be performed in different orders; and 4) certain steps may be done concurrently.

Figure 4:
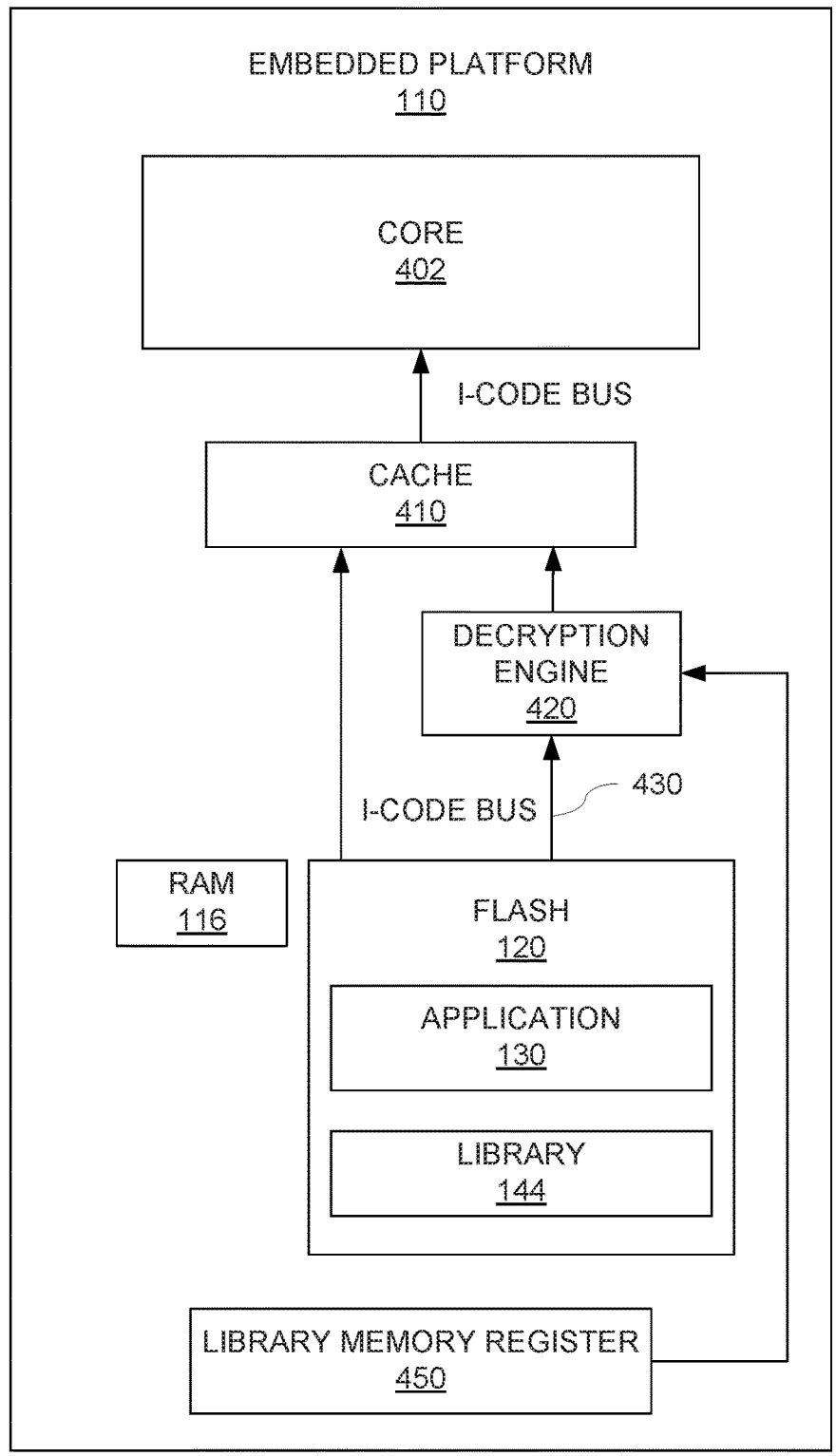
FIG. 4 illustrates an exemplary architecture of a system for protecting software IP from reverse engineering according to various embodiments of the present disclosure.

FIG. 4 illustrates an exemplary architecture of a system for protecting software IP from reverse engineering according to various embodiments of the present disclosure. System 400 comprises core 402, cache 410, secure decryption engine 420, instruction code bus 430, and flash memory 120, e.g., embedded flash, that further comprises application code 130 and library code 144. In embodiments, library code 144 has been encrypted and comprises software IP.

Cache 410 may be part of chip architecture 400 and may be coupled to core 402, e.g., via instruction code bus 430, to decryption engine 420 and to a flash controller (not shown in FIG. 4). Decryption engine 420 may be a fast, secure decryption engine that is embedded in a chip, e.g., in the flash controller. Although, in embodiments, decryption engine 420 is an AES decryption engine, this is not intended as a limitation on the scope of the present disclosure, as any decryption method and any decryption engine may be utilized.

In operation, in embodiments, encrypted library 144 is programmed into flash memory 120 at one or more addresses defined by LMR 450. An application once executed may cause core 402 to call, from time to time, from library 144 a specific routine that is stored in the address range in LMR 450. In FIG. 4, the portion of library 144 that comprises code in encrypted form may be stored in flash memory 120 at a specified protected flash memory address range, e.g., between two addresses 0x100249 and 0x10040F.

In embodiments, core 402 may access encrypted library 144 only when application code 130 is executed. An application may, for example, call via an API (not shown) a function, which may be a set of instructions that represents code within flash memory 120. In embodiments, encrypted library code 144 may be inaccessible and, thus, not controllable by an application developer and yet co-exist with customer application code 130 that may be stored in flash memory 120 in a plain text format. In embodiments, system 400 performs selective encryption and decryption as will be described next.

Once core 402 calls code, and a program counter points to a region of flash memory 120 that has been encrypted, is defined by LMR 450, and comprises encrypted instructions, decryption engine 420 may perform a selective decryption of those instructions. Decryption engine 420 may be secure engine designed receive instructions from library 144 and decrypt instructions, for example, based on the block size of decryption engine 420 (e.g., in block sizes of 16 bytes).

In embodiments, decrypted instructions may be first stored in cache 410 prior to being passed on to core 402, e.g., via instruction code bus 430, for further processing. In embodiments, a request by core 402, which may be implemented as hardware that accesses the protected address range in library 144, serves as a trigger event that causes decryption engine 420 to commence an on-the-fly decryption process for that protected address range. In embodiments, decryption occurs on instruction bus 430 during transfer from flash memory 120 and before data enters cache 410, i.e., outside of flash memory 120.

In scenarios where the program counter does not point to an encrypted region, but instead points to a region that comprises non-encrypted instructions, the non-encrypted instructions may be directly loaded into cache 410 instead of passing through decryption engine 420. In either scenario, the instructions that are loaded to cache 410 may be passed, via instruction code bus 430, to core 402, which executes the instructions.

In embodiments, a binary image of a final application may integrate the application 130 in plain text format with the encrypted library 114 that may comprise functions used by an application. In embodiments, an indirection table may be used to link calls to a function and to an address in library 144.

It shall be understood that in system 400, when decryption engine 420 performs its decryption, the content of library 144 maybe exposed in plain text format; however, because a potential attack on cache 410 would be significantly more costly than the value of content of library 144 itself, such attacks are effectively rendered worthless. Nevertheless, care should be taken that applications are not permitted to read the contents of cache 410. In embodiments, countermeasures, such as anti-side-channel attack methods, may be employed to deter potential attackers, who seek to read out the contents of cache 410, e.g., by recovering the decryption key value for directly decrypting the binary code.

In embodiments, to further increase security and prevent potential attackers from being able to analyze the contents of library 144, e.g., by observing CPU behavior or by return-oriented programming like attacks, hardware may be used to limit jumps to specific authorized locations, such as a jump table that defines functions or entry points to the protected library 144 (which may be scattered across the binary image of library 144). In addition, software may be used to identify authorized jumps and to prevent direct access to library 144.

Finally, RAM 116 may contain data that is processed by protected library 144. Depending on observations made regarding RAM 116 (e.g., a debug enable signal), intermediate data that is processed using library 144 may be guessed for the purpose of obtaining information about the inner workings of chip architecture 400. However, unlike library code, data processed by library code is generally of no value to an attacker. Therefore, RAM 116 will also not leak any to-be-protected information to the outside world.

Figure 5:
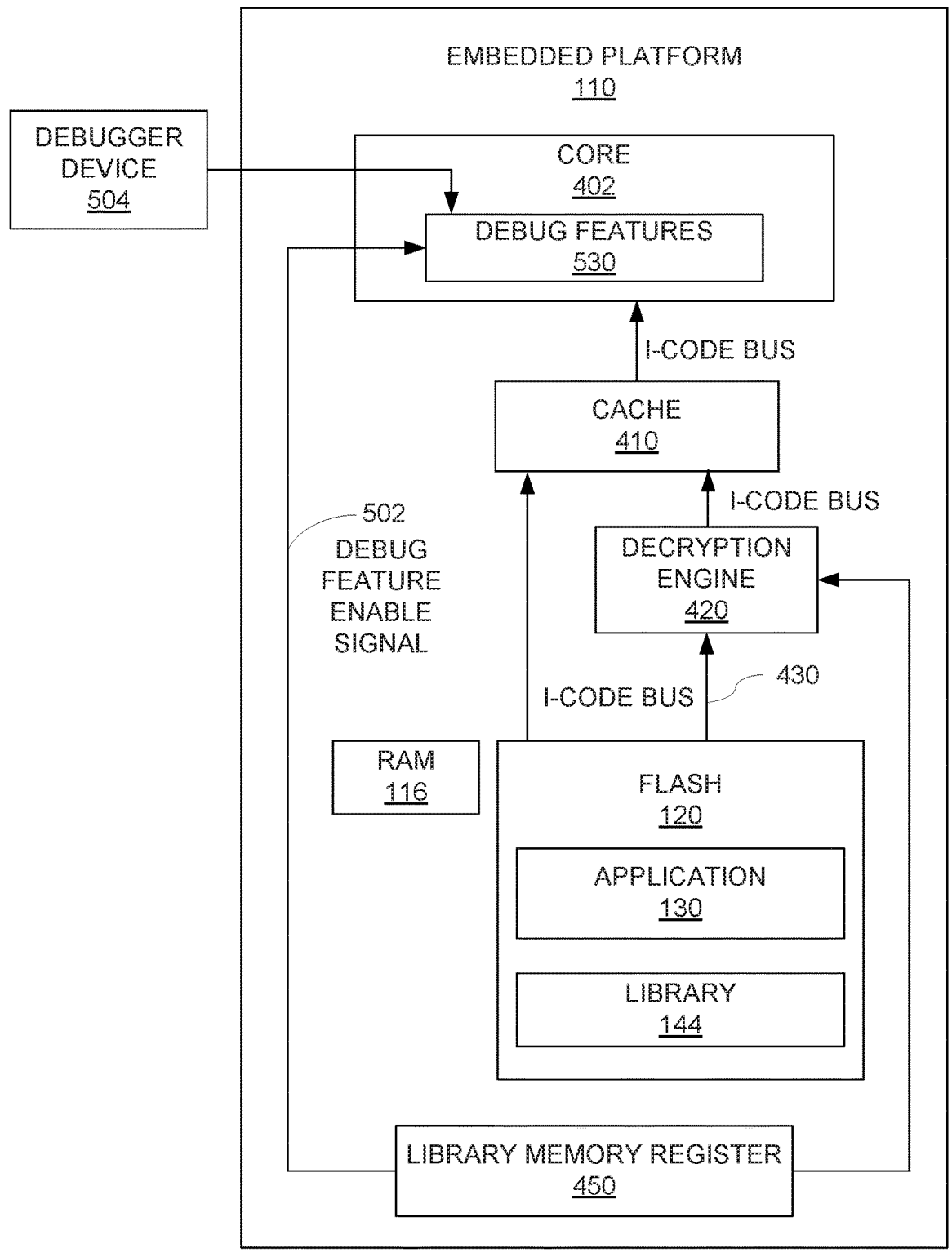
FIG. 5 illustrates a protected system during application development, according to various embodiments of the present disclosure.

FIG. 5 illustrates a protected system during application development, according to various embodiments of the present disclosure. For clarity, components similar to those shown in FIG. 4 are labeled in the same manner. For purposes of brevity, a description or their function is not repeated here. In addition to those components shown in FIG. 4, FIG. 5 comprises debugger device 504, debug features 530, and debug feature enable signal 502. Debug features 530 enable access to memory and, in embodiments, debugging of core 402, e.g., in response to determining an address to which a program counter should point. In embodiments, debug feature enable signal 502, e.g., a DBGEN signal that enables debug events such as breakpoints that can halt a processor or trigger a debug monitor exception. As a result, once debug feature enable signal 502 is inactive or disabled, debugging through a port interfacing debugger device 504 is no longer available.

It is noted that debug feature enable signal 502 is not necessarily tied to any specific microcontroller architecture or user implementation and, in embodiments, shuts down all debug features present in a microcontroller. Besides enabling a debug feature, debug feature enable signal 502 may target any number of independent debug engines in a microcontroller, e.g., one driving the CPU core (breakpoints, step-by-step execution, register dump, etc.), one driving memory access (independently from the CPU core), one driving some peripherals, and the like.

In embodiments, debug feature enable signal 502 may be provided by a microcontroller or various subparts of thereof, such as core 402 or a debug controller that may provide/enable direct memory access to debugger device 504. Debugger device 504 may be any debugging tool known in the art—typically a hardware device that runs some type of debugging software—e.g., a JTAG probe that performs read and write operations in a JTAG session during application development.

In a manner similar to the operation of architecture in FIG. 4, when the program counter is not in a range of flash memory 120 that is defined by LMR 450, regular operations are performed, including fetching code from flash memory 120 via instruction code bus 430 and moving code to cache 410 and core 402, i.e., without utilizing decryption operations provided by decryption engine 420.

In embodiments, once debugger device 504 is coupled to system 500 and program counter is in the LMR 450 range, i.e., in a protected range that comprises encrypted instructions, debug feature enable signal 502 is disabled. As a result, no information is reported to debugger device 504, e.g., when library code from the protected range is executed. In embodiments, breakpoints within LMR range are ignored, in effect, disabling during the execution of library code any debug features and read access to memory content to protect library 144 and allow library code to be executed without interruption or step-by-step execution by debugger device 504, which may otherwise be used to extract clues about the executed instructions. For example, even if executed instructions cannot be read, many registers can be dumped, and the side effects of the instruction can be observed and analyzed by the motivated attacker.

In embodiments, when a function that has been called does not fall in the protected range of library 144 such that the program counter points outside of the protected area, debug access may be restored by reenabling debug feature enable signal 502. As a result, an application developer may continue to add breakpoints and resume performing step-by-step debugging of code.

In embodiments, once decryption engine 420 decrypts the code in the library for instruction execution, a customer application can be debugged as usual without any impact or penalty on system performance (e.g., ARM core), whereas the protected code may run in an opaque, non-interruptible environment. In embodiments, a suitable instruction cache 410 size effectively hides the processing cost of decryption, e.g., by reducing the number of times certain instructions have to be loaded into cache 410 to be decrypted.

In scenarios when system 500 switches from a raw mode (i.e., decryption device bypassed) to a protected mode by disabling debug feature enable signal 502, the communication to debugger device 504 may be lost. Accordingly, debugger device 504 should be made robust to handle and recover from such potential loss of connection.

One of skill in the art will appreciate that the protection systems and methods presented herein may equally be applied to the protected code (e.g., software libraries) stored in external flash memory devices. A person of skill in the art will further appreciate that the protection mechanisms may be used to protect third party code. For example, if the decryption key is protected in the chip instead in flash memory 120, then, even if flash memory 120 is located external to system 500 and, thus, easily accessible to potential attackers, the data contained in flash memory 120 will not reveal any useful data to adversaries in its encrypted format.

Figure 6:
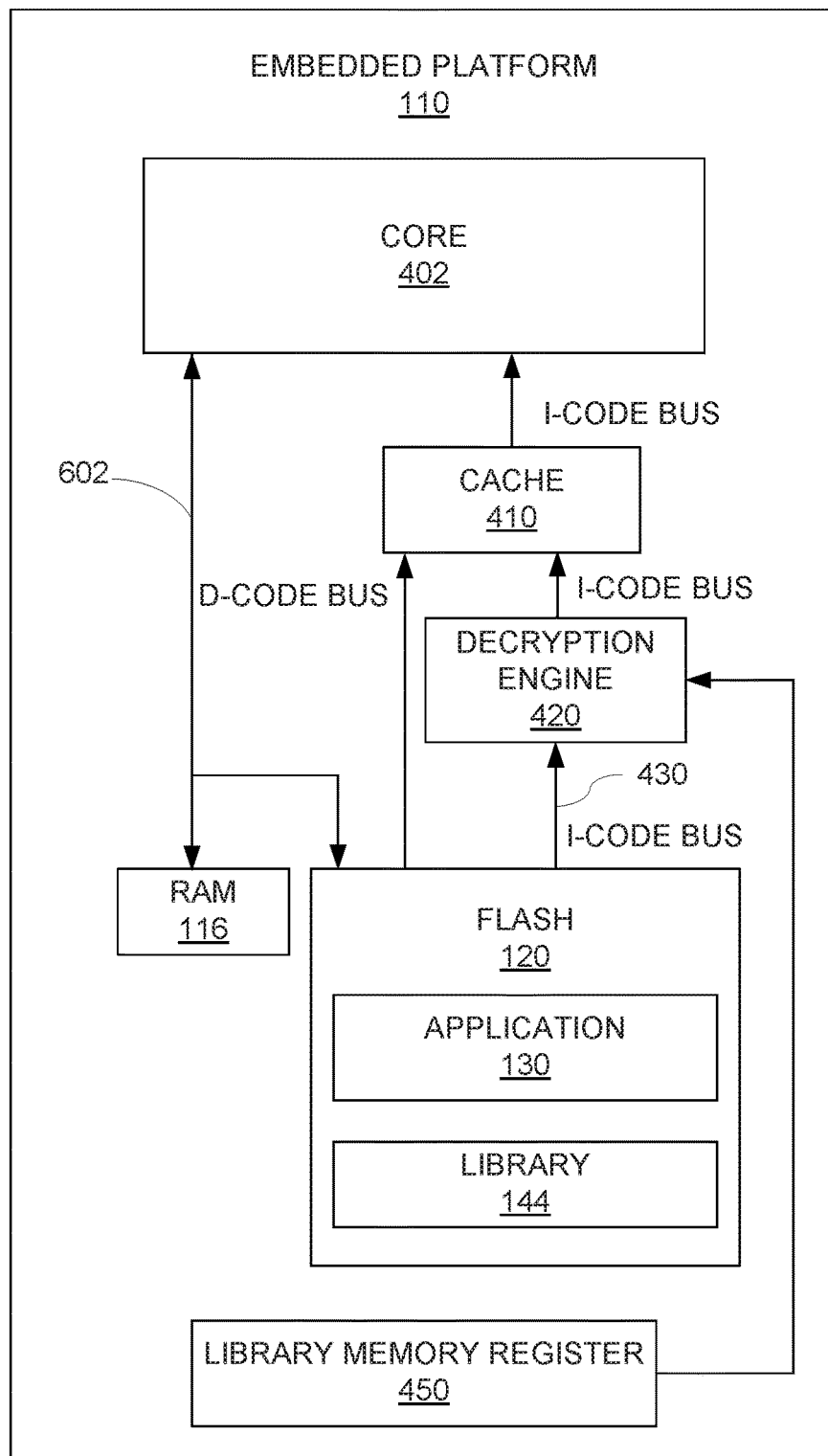
FIG. 6 illustrates a scenario in which an application attempts to read data from the protected system according to various embodiments of the present disclosure.

FIG. 6 illustrates a scenario in which an application attempts to read data from the protected system according to various embodiments of the present disclosure. Same numerals as in FIG. 4 denote similar elements. In addition to instruction code bus 430, system 600 in FIG. 6 comprises data code bus 602 that may couple core 402 to flash memory 120. Core 402 may be based on any architecture, e.g., a Harvard architecture that implements two busses, such as instruction code bus 430 and data code bus 602.

In embodiments, data code bus 602 provides access to the content of flash memory 120 in a raw mode in which no decryption processing occurs on data code bus 602. In scenarios in which an application attempts to accesses library 144 and library code stored therein, e.g., to initiate a memory dump, since the data will have to flow through data code bus 602, thereby, skipping a path through decryption engine 420, the data accessed in library 144 will remain in its encrypted format and will be read in plain text "as is" because the data text has not undergone a decryption by decryption engine 420. As a result, any memory read access for the purpose of reading out flash memory 120 through data code bus 602 path will result in plain text access that will not yield access to decrypted data. This ensures that the to-be-protected content of library 144 will remain secure.

In embodiments, instruction bus 430 is dedicated to fetching instructions for execution, such that instructions cannot be dumped through this channel, but rather be only executed. In embodiments, data code bus 602 is dedicated to fetching data and storing the data in various memory locations or internal core registers. During the execution of an instruction, data code bus 602 may be involved, e.g., because the instruction may require a memory transfer that may require reading or writing over data code bus 602. In embodiments, data code bus 602 may use a data cache that it is not linked to decryption engine 420 and is separate from an instruction cache (both not shown in FIG. 6) used by instruction code bus 430.

In embodiments, write protection may be used to control write operations in flash memory 120, such that a user may be prevented from reprogramming certain areas of flash memory 120. In addition, update programming may be controlled by an authentication mechanism.

Aspects of the present patent document are directed to information handling systems. For purposes of this disclosure, an information handling system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
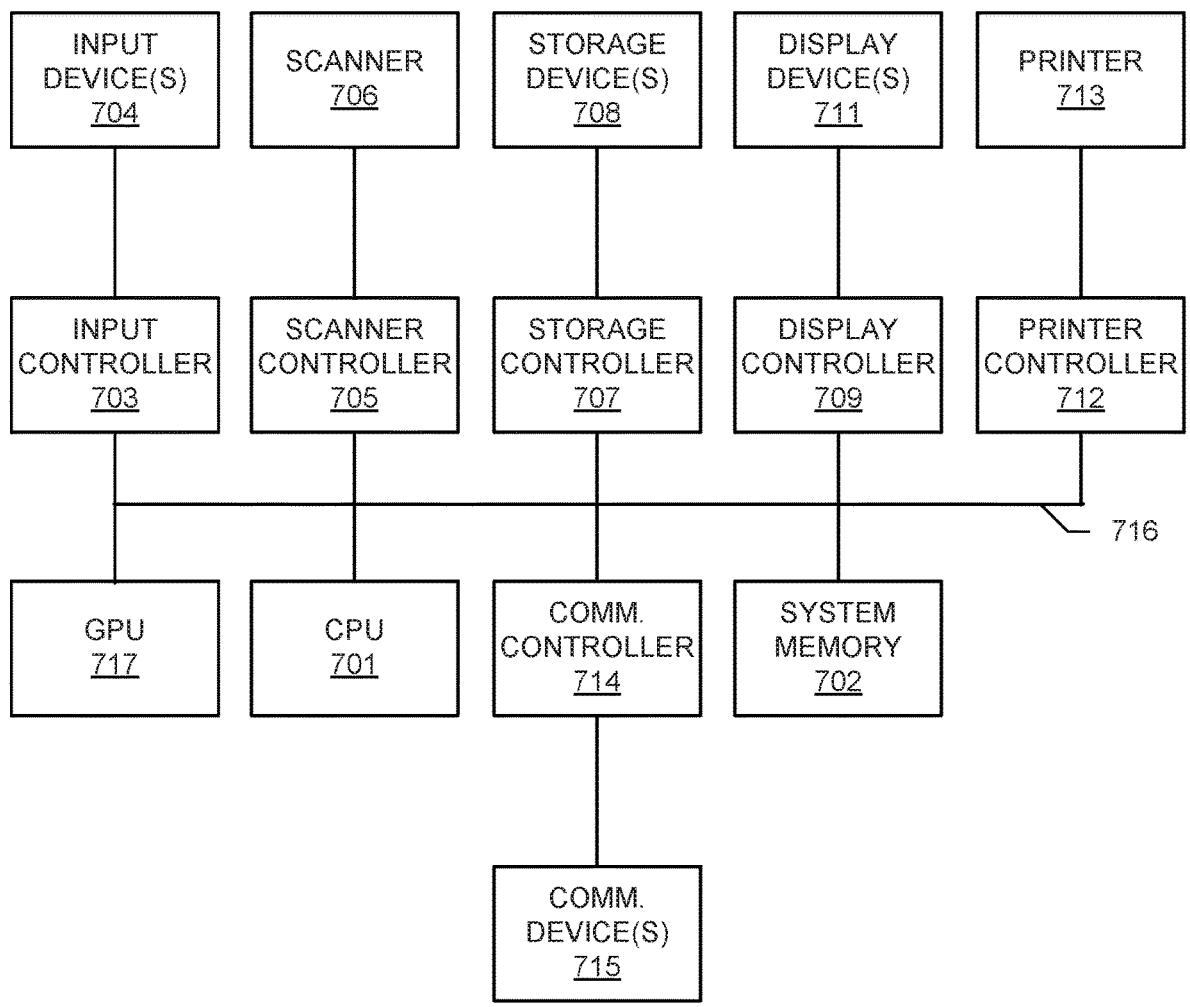
FIG. 7 depicts a simplified block diagram of a computing system, in accordance with embodiments of the present disclosure.

FIG. 7 depicts a simplified block of a computing system, according to embodiments of the present invention. It will be understood that the functionalities shown for system 700 may operate to support various embodiments of an information handling system—although it shall be understood that an information handling system may be differently configured and include different components. As illustrated in FIG. 7, system 700 includes a central processing unit (CPU) 701 that provides computing resources and controls the computer. CPU 701 may be implemented with a microprocessor or the like, and may also include a graphics processor and/or a floating point coprocessor for mathematical computations. System 700 may also include a system memory 702, which may be in the form of random-access memory (RAM) and read-only memory (ROM).

A number of controllers and peripheral devices may also be provided, as shown in FIG. 7. An input controller 703 represents an interface to various input device(s) 704, such as a keyboard, mouse, or stylus. There may also be a scanner controller 705, which communicates with a scanner 706. System 700 may also include a storage controller 707 for interfacing with one or more storage devices 708 each of which includes a storage medium such as magnetic tape or disk, or an optical medium that might be used to record programs of instructions for operating systems, utilities and applications which may include embodiments of programs that implement various aspects of the present invention. Storage device(s) 708 may also be used to store processed data or data to be processed in accordance with the invention. System 700 may also include a display controller 709 for providing an interface to a display device 711, which may be a cathode ray tube (CRT), a thin film transistor (TFT) display, or other type of display. The computing system 700 may also include a printer controller 712 for communicating with a printer 713. A communications controller 714 may interface with one or more communication devices 715, which enables system 700 to connect to remote devices through any of a variety of networks including the Internet, an Ethernet cloud, a Fiber Channel over Ethernet (FCoE)/Data Center Bridging (DCB) cloud, a local area network (LAN), a wide area network (WAN), a storage area network (SAN) or through any suitable electromagnetic carrier signals including infrared signals.

In the illustrated system, all major system components may connect to a bus 716, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means"

terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It shall be noted that elements of the claims, below, may be arranged differently including having multiple dependencies, configurations, and combinations. For example, in embodiments, the subject matter of various claims may be combined with other claims.

It will be appreciated to those skilled in the art that the preceding examples and embodiment are exemplary and not limiting to the scope of the present invention. It is intended that all permutations, enhancements, equivalents, combinations, and improvements thereto that are apparent to those skilled in the art upon a reading of the specification and a study of the drawings are included within the true spirit and scope of the present invention.

What is claimed is:

1. A method for protecting software from reverse engineering, the method comprising:
   in response to the software being called by an application, determining whether a program counter falls in a first address range of a non-volatile memory that comprises encrypted instructions that are inaccessible to an application developer to prevent the reverse engineering and is defined by a library memory register (LMR), the non-volatile memory further comprising a second address range to store non-encrypted instructions;
   in response to determining that the program counter falls in the first address range, communicating the encrypted instructions to a decryption engine that generates decrypted instructions from the encrypted instructions;
   loading the decrypted instructions into a cache prior to communicating the decrypted instructions, via an instruction code bus, to a core that executes the decrypted instructions; and
   in response to determining that the program counter falls in the second address range, loading, via the instruction code bus, the non-encrypted instructions into the cache without communicating the encrypted instructions to the decryption engine.

2. The method according to claim 1, further comprising, in response to the program counter pointing to the protected range that comprises the encrypted instructions, disabling a debug enable signal to disable access by a debugger device thereby preventing direct memory access to the first address range.

3. The method according to claim 2 further comprising, in response to the program counter pointing outside of the protected range enabling the debug enable signal to restore access by the debugger device to resume debugging operations.

4. The method according to claim 3, wherein the debugger device is a Joint Test Action Group (JTAG) probe.

5. The method according to claim 1, further comprising, in response to a request by the core and prior to loading the decrypted instructions into the cache, using the decryption engine to commence an on-the-fly decryption process to generate the decrypted instructions.

6. The method according to claim 1, wherein the decrypted instructions are based on a block size of the decryption engine.

7. The method according to claim 1, further comprising hardware that uses a jump table to control one of a function and an entry point to the non-volatile memory to prevent access to a library.

8. The method according to claim 1, further comprising limiting access to encrypted data in the first address range to instances where also binary code is executed to prevent access to a plain text version of the encrypted data.

9. The method according to claim 8, wherein the encrypted data is one of an executable code and a library source code.

10. The method according to claim 9, wherein at least a portion of the library source code that comprises encrypted code is decrypted and then re-encrypted using a unique key that is associated with a chip.

11. The method according to claim 1, wherein the non-volatile memory is an external flash memory.

12. The method according to claim 1, further comprising using a controller that comprises a secure Advanced Encryption Standard (AES) engine to encrypt data with a key.

13. The method according to claim 12, wherein the key is stored in memory embedded in hardware.

14. A security system for protecting software from reverse engineering, the security system comprising:
   a core coupled to an instruction code bus, the core being configured to call an application and to execute decrypted instructions;
   a cache coupled to communicate the decrypted instructions, via the instruction code bus, to the core;
   a decryption engine coupled to the cache and the core, the decryption engine configured to decrypt encrypted instructions and load the decrypted instructions into the cache;

a library memory register (LMR) that defines a first address range that is inaccessible to an application developer to prevent the reverse engineering;

a non-volatile memory configured to store the encrypted instructions in the first address range and non-encrypted instructions in a second address range; and one or more processors that in response to the software being called by the application, determine whether a program counter falls in the first address range and, if so, communicate the encrypted instructions to the decryption engine, and if the program counter falls in the second address range, load the non-encrypted instructions into the cache without communicating the encrypted instructions to the decryption engine.

15. The security system according to claim 14, further comprising hardware that uses a jump table to control one of a function and an entry point to the non-volatile memory to prevent access to a library.

16. The security system according to claim 14, further comprising limiting access encrypted data in the first address range thereby preventing access to instances where also binary code is executed to prevent access to a plain text version of the encrypted data.

17. The security system according to claim 14, wherein, in response to the program counter pointing to a protected range that comprises the encrypted instructions, a debug enable signal is disabled to disable access by a debugger device thereby preventing direct memory access to the first address range.

18. The security system according to claim 17, wherein, in response to the program counter pointing outside of the protected range, the debug enable signal is enabled to restore access by the debugger device to resume debugging operations.

19. The security system according to claim 18, wherein the debugger device is a Joint Test Action Group (JTAG) probe.

20. The security system according to claim 14, wherein the non-volatile memory is an external flash memory.

* * * * *